United States Patent
Komano et al.

(10) Patent No.: US 10,193,691 B2
(45) Date of Patent: Jan. 29, 2019

(54) INFORMATION PROCESSING DEVICE, SERVER DEVICE, INFORMATION PROCESSING SYSTEM, MOVING OBJECT, AND INFORMATION PROCESSING METHOD

(71) Applicant: Kabushiki Kaisha Toshiba, Minato-ku (JP)

(72) Inventors: Yuichi Komano, Yokohama (JP); Takeshi Kawabata, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 172 days.

(21) Appl. No.: 15/443,727

(22) Filed: Feb. 27, 2017

(65) Prior Publication Data

US 2018/0076959 A1 Mar. 15, 2018

(30) Foreign Application Priority Data

Sep. 9, 2016 (JP) ................................. 2016-176824

(51) Int. Cl.
*H04L 29/06* (2006.01)
*H04L 9/08* (2006.01)
(Continued)

(52) U.S. Cl.
CPC .............. *H04L 9/0891* (2013.01); *G09C 1/00* (2013.01); *H04L 9/0618* (2013.01);
(Continued)

(58) Field of Classification Search
CPC ... H04L 9/0618; H04L 9/0822; H04L 9/0861; H04L 9/0869; H04L 9/3242;
(Continued)

(56) References Cited

U.S. PATENT DOCUMENTS

| 8,997,198 B1 * | 3/2015 | Kelley | .................... H04L 63/06 726/10 |
| 9,946,720 B1 * | 4/2018 | Bennett | ............. G06F 17/30109 |

(Continued)

FOREIGN PATENT DOCUMENTS

| JP | 10-171717 | 6/1998 |
| JP | 2009-267451 | 11/2009 |

(Continued)

OTHER PUBLICATIONS

Marko Wolf, et al., "Design, Implementation, and Evaluation of a Vehicular Hardware Security Module", Springer-Verlag, 2012, pp. 302-318.

(Continued)

*Primary Examiner* — Mohammad A Siddiqi
(74) *Attorney, Agent, or Firm* — Oblon, McClelland, Maier & Neustadt, L.L.P.

(57) ABSTRACT

According to an embodiment, an information processing device includes a conversion unit, an encryption unit, and a transmission unit. The conversion unit converts a first encryption key to be used for generation of a master key to be shared with a server device by using a second conversion rule to generate a third encryption key to be a new master key. The second conversion rule is different from a first conversion rule used for generation of a second encryption key that is the master key currently used for encrypted communication with the server device. The encryption unit generates a ciphertext so that the server device derives the third encryption key on a basis of the second encryption key and the third encryption key. The transmission unit transmits the ciphertext to the server device.

2 Claims, 10 Drawing Sheets

(51) Int. Cl.
  *H04L 9/06* (2006.01)
  *G09C 1/00* (2006.01)
  *H04L 9/32* (2006.01)
(52) U.S. Cl.
  CPC .......... *H04L 9/0822* (2013.01); *H04L 9/0825* (2013.01); *H04L 9/0861* (2013.01); *H04L 9/0866* (2013.01); *H04L 9/0869* (2013.01); *H04L 9/3242* (2013.01); *H04L 2209/84* (2013.01)
(58) Field of Classification Search
  CPC ... H04L 9/0825; H04L 9/0866; H04L 9/0891; H04L 2209/84; G09C 1/00
  See application file for complete search history.

(56) References Cited

U.S. PATENT DOCUMENTS

| | | | |
|---|---|---|---|
| 2014/0208117 A1* | 7/2014 | Hayashi | H04L 63/0471 713/171 |
| 2015/0016606 A1 | 1/2015 | Omino et al. | |
| 2015/0200917 A1* | 7/2015 | Fujii | H04L 9/0847 713/171 |
| 2016/0127348 A1* | 5/2016 | Bradley | G06F 21/42 713/168 |
| 2017/0139795 A1 | 5/2017 | Komano et al. | |
| 2017/0142123 A1 | 5/2017 | Komano et al. | |

FOREIGN PATENT DOCUMENTS

| | | |
|---|---|---|
| JP | 2010-4420 | 1/2010 |
| JP | 2014-30207 | 2/2014 |
| JP | 2015-19333 | 1/2015 |
| JP | 2017-091360 A | 5/2017 |
| JP | 2017-092807 A | 5/2017 |

OTHER PUBLICATIONS

A. Menezes, et al., "Handbook of Applied Cryptography: Chapter 13: Key Management Techniques", CRC Press, Inc., XP001525013, 1997, pp. 543-590 with cover page.

Christian Schleiffer, et al., "Secure Key Management—A Key Feature for Modern Vehicle Electronics", SAE International, 2012, pp. 1-8.

* cited by examiner

| TERMINAL ID | SECOND ENCRYPTION KEY |
|---|---|
| 01 | XXXXX |
| 02 | XXXXY |
| 03 | XXXYY |
| 04 | |
| | |
| | |

INFORMATION PROCESSING DEVICE, SERVER DEVICE, INFORMATION PROCESSING SYSTEM, MOVING OBJECT, AND INFORMATION PROCESSING METHOD

CROSS-REFERENCE TO RELATED APPLICATIONS

This application is based upon and claims the benefit of priority from Japanese Patent Application No. 2016-176824, filed on Sep. 9, 2016; the entire contents of which are incorporated herein by reference.

FIELD

Embodiments described herein relate generally to an information processing device, a server device, an information processing system, a moving object, and an information processing method.

BACKGROUND

Use of encryption keys for encrypted communication between a plurality of terminals include symmetric key encryption processes in which the same encryption key is used at a transmitting end and a receiving end, and asymmetric key encryption processes in which different encryption keys are used at a transmitting end and a receiving end. A symmetric key encryption process is smaller in the amount of calculation for encryption than an asymmetric key encryption process, and is thus suitable for processing compact terminals. In a symmetric key encryption process, however, the same encryption key needs to be shared in advance between a transmitting end and a receiving end. Furthermore, the shared encryption key needs to be periodically updated so that the encryption key is prevented from being compromised.

For example, JP-A 10-171717(KOKAI) discloses provision of a storage unit from/into which legitimate programs can be read or written but unauthorized reading and writing cannot be performed from outside in each of a host computer and an IC card. JP-A 10-171717(KOKAI) also discloses that a master key is stored in each of the storage units of the host computer and the IC card and periodically updated.

BRIEF DESCRIPTION OF THE DRAWINGS

FIG. 4 is a schematic table illustrating an example of data configuration of a master key management DB;

DETAILED DESCRIPTION

According to an embodiment, an information processing device includes a conversion unit, an encryption unit, and a transmission unit. The conversion unit converts a first encryption key to be used for generation of a master key to be shared with a server device by using a second conversion rule to generate a third encryption key to be a new master key. The second conversion rule is different from a first conversion rule used for generation of a second encryption key that is the master key currently used for encrypted communication with the server device. The encryption unit generates a ciphertext so that the server device derives the third encryption key on a basis of the second encryption key and the third encryption key. The transmission unit transmits the ciphertext to the server device.

An information processing system according to an embodiment is applicable to an in-vehicle network system (communication system) installed in an automobile that is one example of a moving object. An example in which an in-vehicle gateway (hereinafter abbreviated to "GW") included in the in-vehicle network system serves as a server device of the embodiment will be described below. In addition, an example in which an electronic control unit (hereinafter abbreviate to "ECU") included in the in-vehicle network system serves as an information processing device of the embodiment will be described below.

Note that devices and systems to which the information processing system of the embodiment is applicable are not limited to the examples below. The information processing system of the embodiment is widely applicable to various systems for encrypted communication between a transmitting end and a receiving end.

First Embodiment

Figure 1:
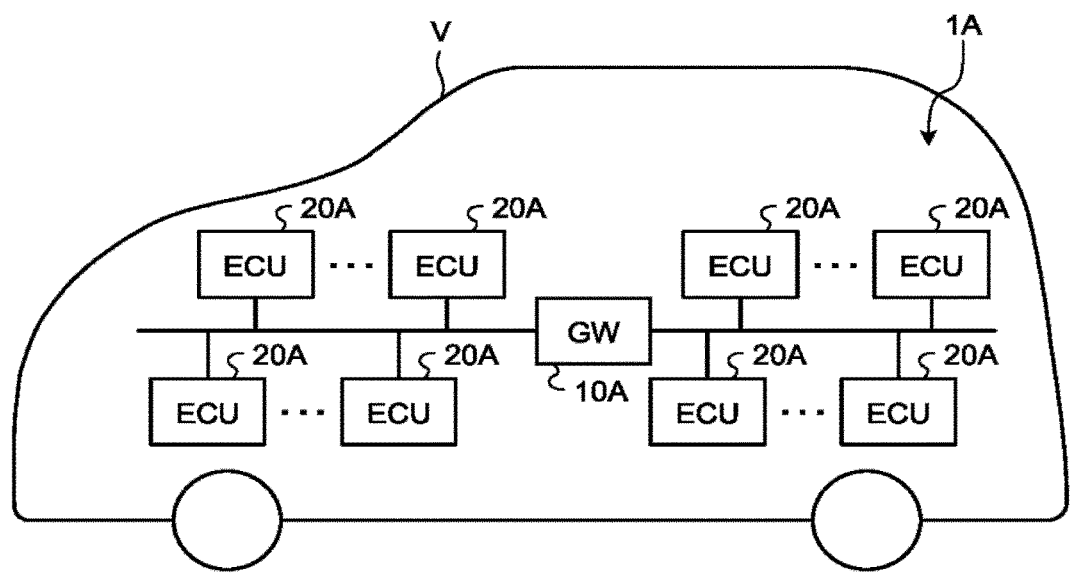
FIG. 1 is a schematic diagram illustrating an outline of an information processing system.

FIG. 1 is a schematic diagram illustrating an outline of an information processing system 1A. As illustrated in FIG. 1, the information processing system 1A has a configuration in which a GW 10A and one or more ECUs 20A are connected with one another via a network. The GW 10A is an example of the server device. The ECUs 20A are an example of the information processing device.

In the present embodiment, the GW 10A performs various processes described below in addition to primary functions as a gateway. Examples of the primary functions as a gateway include relay of communication between subnetworks in the information processing system 1A, and relay of communication between the information processing system 1A and a network outside of the vehicle. Similarly, an ECU 20A performs various processes described below in addition to primary functions as an electronic device installed in an automobile V.

Note that the communication standard for the information processing system 1A is not limited. The communication standard for the information processing system 1A is CAN (Controller Area Network) or FlexRay (registered trademark), for example.

In a case where a plurality of ECUs 20A cooperate to control the automobile V, the ECUs 20A and the GW 10A performs communication via a network to transmit and receive control signals. Control signals used herein collectively refer signals transmitted and received between the ECUs 20A and the GW 10A to control the automobile V. For transmission and reception of control signals between the ECUs 20A and the GM 10A, the validity communication needs to be guaranteed so that erroneous control is prevented. In communication while the automobile V is moving, since the real-time property is required for the communication, time cannot be consumed for processing for guaranteeing the validity of the communication. Thus, in the present embodiment, an authentication technology using a message authentication code (MAC) allowing authentication of communication in a short time is used to guarantee the validity of communication between the GW 10A and the ECUs 20A.

According to the MAC authentication technology, a master key shared in advance between a transmitting end and a receiving end is used for deriving an MAC value necessary for authentication. In the present embodiment, each of the ECUs 20A generates a master key to be shared with each of the other ECUs 20A and the GW 10A from first encryption key that is a seed, and uses the generated master key for encrypted communication (details of which will be described below). In the case where the information processing system 1A includes a plurality of ECUs 20A, each of the ECUs 20A is assumed to have a unique first encryption key.

Figure 2:
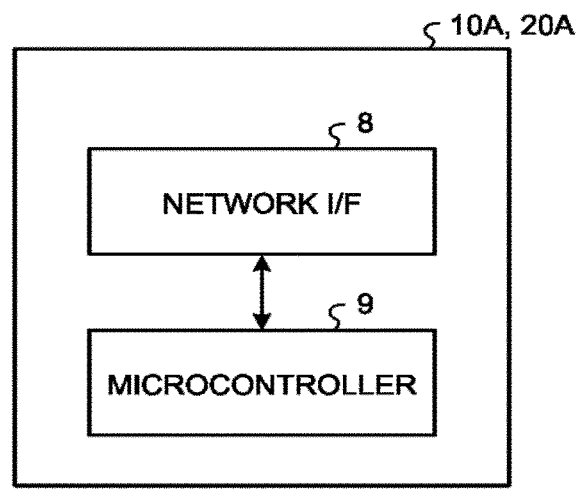
FIG. 2 is a block diagram illustrating an example of hardware configuration of a GW and an ECU.

FIG. 2 is a block diagram illustrating an example of hardware configuration of the GW 10A and the ECUs 20A. Each of the GW 10A and the ECUs 20A includes a network interface (I/F) 8, and a microcontroller 9, for example. The network I/F 8 is an interface for connecting the GW10 and the ECUs 20A to a network. The microcontroller 9 is a computer system integrated as an integrated circuited, and performs various controls according to programs (software) running on the computer system. Each of the GW 10A and the ECUs 20A implements various functions, which will be described below, by the microcontroller 9 performing controls according to the programs while using the network I/F 8.

Figure 3:
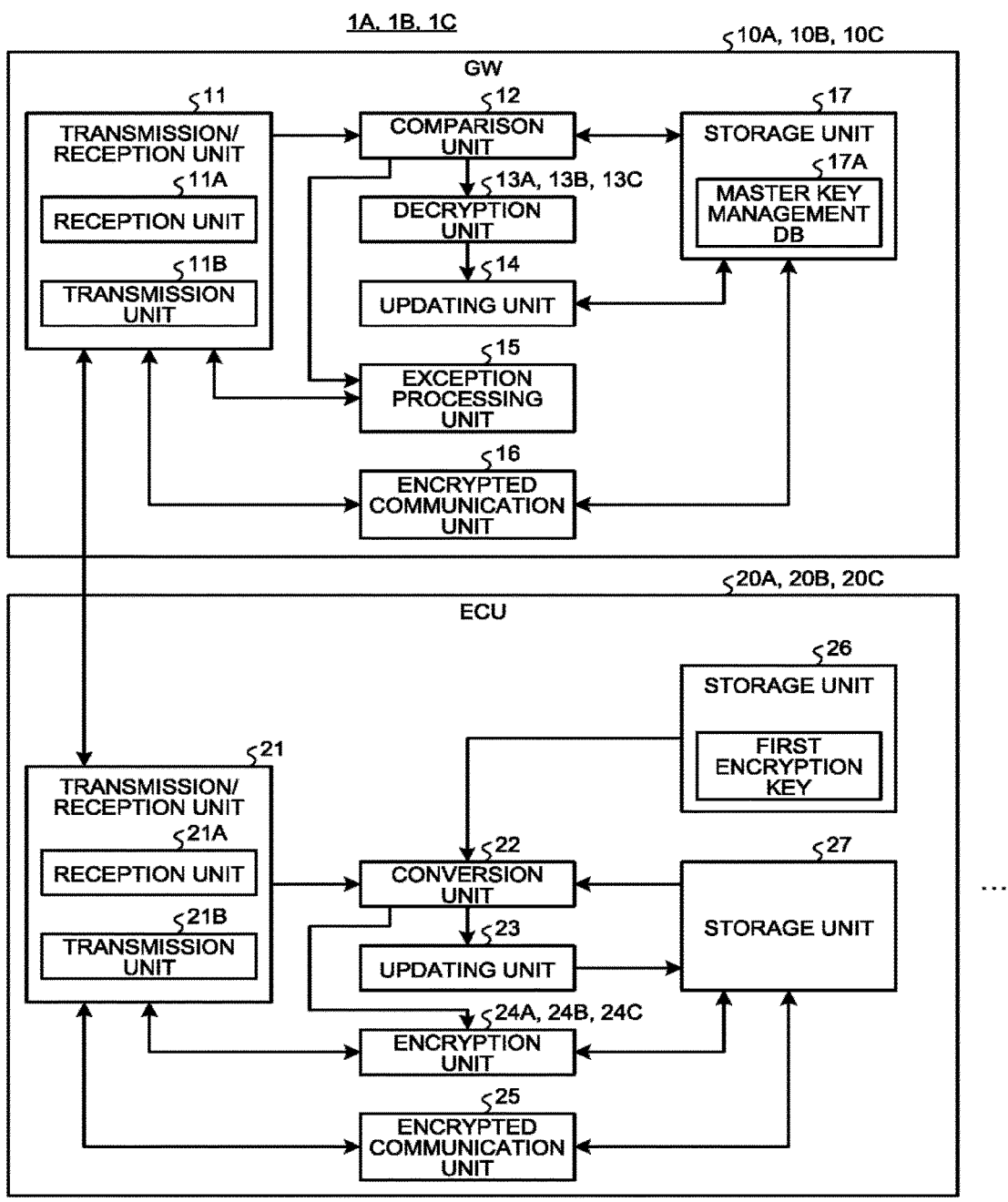
FIG. 3 is a block diagram illustrating an example of functional configurations of the GW and the ECU.

FIG. 3 is a block diagram illustrating example of functional configurations of the GW 10A and the ECUs 20A included in the information processing system 1A of the present embodiment. For simplicity of explanation, one ECU 20A is assumed as an example in the description below. In practice, however, each of the ECUs 20A provided in the information processing system 1A performs processes, which will be described below.

—Ecu20A—

First, an ECU 20A will be described. The ECU 20A is an example of the information processing device. The ECU 20A includes a transmission/reception unit 21, a conversion unit 22, an updating unit 23, an encryption unit 24A, an encrypted communication unit 25, a storage unit 26, and a storage unit 27, for example, as functional components relating to encrypted communication.

The storage unit 26 is a read-only memory. The storage unit 26 is a nonvolatile memory such as a mask read-only memory (ROM) or an electrically erasable programmable read-only memory (EEPROM), for example.

The storage unit 26 stores a first encryption key in advance. The first encryption key is an encryption key held by the ECU 20, and used as a seed key for generating a master key (a second encryption key or a third encryption key, which will be described below) to be shared with the GW 10A.

The storage unit 27 is a data erasable and rewritable memory. The storage unit 27 is dynamic random access memory (RAM) (DRAM) or a static RAM (SRAM), for example.

The storage unit 27 stores a second encryption key, a public key of the GW 10A or a pre-shared key shared with the GW 10A, a first conversion rule, and a second conversion rule.

The second encryption key is a master key currently used in encrypted communication with the GW 10A. Specifically, the second encryption key is shared between the GW 10A and the present ECU 20A, and used for encrypted communication and an authentication process.

The second encryption key is updated by a third encryption key (details of which will be described below). The third encryption key is an encryption key generated from the first encryption key as a new master key to be shared with the GW 10A (details of which will be described below).

The public key of the GW 10A is shared in advance between the ECU 20A and the GW 10A. The pre-shared key shared with the GW 10A is an encryption key secretly pre-shared between the GW 10A and the ECU 20A. The pre-shared key may be secretly written in advance in a storage unit (the storage unit 26, the storage unit 27, or the storage unit 17) of each of the GW 10A and the ECU 20A by the manufacturers of the GW 10A and the ECU 20A during manufacture of the GW 10A and the ECU 20A, for example.

The first conversion rule is a conversion rule used in generating the second encryption key from the first encryption key. In other words, the first conversion rule is a conversion rule used in generating the second encryption key, which is a master key currently shared with the GW 10A, from the first encryption key.

The second conversion rule is a conversion rule used in generating the third encryption key from the first encryption key. Specifically, the second conversion rule is a conversion rule used in generating the third encryption key, which is a master key to be newly shared with the GW 10A, from the first encryption key. The second conversion rule is a conversion rule different from the first conversion rule.

Hash functions, matrix operations, and the like, for example, are used for the first conversion rule and the second conversion rule. Specifically, the first conversion rule and the second conversion rule are conversion rules for inputting information of the first encryption key linked with a CNT to a hash function such as a secure hash algorithm (SHA) to obtain an output. Note that a CNT may be the number of times the second encryption key or the third encryption key is derived, or the time when the second encryption key or the third encryption key is derived. Alternatively, in addition to the CNT, a random number RND may be generated and input together with the first encryption key and the CNT to a hash function in deriving the second encryption key or the third encryption key. In this case, the storage unit 27 may store a hash function algorithm, a CNT, and an RND as a conversion rule (the first conversion rule, the second conversion rule).

Note that the fact that the first conversion rule and the second conversion rule are different conversion rules may mean that the first and second conversion rules have different functions such as hash functions or that at least one of the parameters such as CNTs and RNDs contained in the first and second conversion rules is different.

Note that the ECU 20A preferably uses the first conversion rule and the second conversion rule with which the second encryption key and the third encryption key can be verified to be calculated from the same first encryption key (seed key).

Next, the transmission/reception unit 21 will be described. The transmission/reception unit 21 performs communication with the GW 10A and the other ECUs 20A. The transmission/reception unit 21 includes a reception unit 21A and a transmission unit 21B.

The reception unit 21A receives various data such as a key setting command and a key update command from the GW 10A.

A key setting command is a command indicating a request for setting a second encryption key. In the present embodiment, the GW 10A transmits a key setting command indicating a request for setting a second encryption key to an ECU 20A for which no second encryption key is set. The reception unit 21A of the ECU 20A outputs the received key setting command to the conversion unit 22.

A key update command is a command indicating a request for updating a second encryption key. In the present embodiment, the GW 10A periodically transmits a key update command indicating a request for updating a second encryption key to an ECU 20A for which a second encryption key has been set. The reception unit 21A of the ECU 20A outputs the received key update command to the conversion unit 22.

The transmission unit 21B transmits various data such as a terminal ID and a ciphertext to the GW 10A. The terminal ID is identification information of the ECU 20A. Details of a ciphertext to be transmitted by the transmission unit 21B to the GW 10A will be described below.

The conversion unit 22 converts the first encryption key stored in the storage unit 26 by using the second conversion rule to generate a third encryption key. The encryption unit 24A generates a ciphertext for deriving the third encryption key at the GW 10A. In the present embodiment, the encryption unit 24A encrypts the third encryption key with the second encryption key to generate a ciphertext (details of which will be described below). The updating unit 23 stores the third encryption key generated by the conversion unit 22 or the second conversion rule used for generating the third encryption key as a second encryption key or a first conversion rule in the storage unit 27.

Next, each of an initial setting process and an updating process performed by the conversion unit 22, the updating unit 23, and the encryption unit 24A will be described.

The initial setting process is a process of setting, in an ECU 20A for which no second encryption key is set and the GW 10A, a second encryption key to be used for encrypted communication between the ECU 20A and the GW 10A. The updating process is a process of updating the second encryption key set in the ECU 20A and the GW 10A.

First, the initial setting process performed by the conversion unit 22, the updating unit 23, and the encryption unit 24A of the ECU 20A will be described.

The conversion unit 22 determines whether or not to start the initial setting process. In the present embodiment, the conversion unit 22 determines to start the initial setting process when a key setting command is received from the GW 10A via the reception unit 21A. Alternatively, the conversion unit 22 may determine to start the initial setting process when a predetermined condition, such as no second encryption key or no first conversion rule being set in the storage unit 27, is satisfied. Still alternatively, the conversion unit 22 may determine to start the initial setting process when a response to a command having been transmitted to the GW 10A via the transmission unit 21B indicates a request for setting a second encryption key.

For starting the initial setting process, the conversion unit 22 reads the first encryption key from the storage unit 26. The conversion unit 22 also reads the public key of the GW 10A and the second conversion rule from the storage unit 27.

The conversion unit 22 then converts the first encryption key by using the second conversion rule to generate a third encryption key.

Note that, at a point when the ECU 20A received the key setting command, no second encryption key for the ECU 20A had been set (that is, stored) in both of the GW 10A and the ECU 20A. Thus, at a point before the initial setting process is performed, the ECU 20A had not generated a third encryption key, and no second conversion rule had been stored in the storage unit 27. The conversion unit 22 thus reads a hash function algorithm from the storage unit 27 and inputs new parameters such as a CNT and an RND to the hash function algorithm to generate a second conversion rule. The conversion unit 22 can therefore read out the second conversion rule.

The conversion unit 22 then converts the first encryption key by using the second conversion rule to generate a third encryption key.

The encryption unit 24A encrypts the third encryption key generated by the conversion unit 22 to generate a ciphertext. The encryption unit 24A encrypts the third encryption key generated by the conversion unit 2 by using the public key of the GW 10A or the pre-shared key shared with the GW 10A stored in the storage unit 27, to generate a ciphertext.

The transmission unit 21B transmits the ciphertext generated by the encryption unit 24A and the terminal ID of the ECU 20A to the GW 10A.

The updating unit 23 stores the third encryption key generated by the conversion unit 22 as a second encryption key in the storage unit 27. In the present embodiment, the updating unit 23 stores the second conversion rule used for generating the third encryption key as a first conversion rule in the storage unit 27. In this manner, the updating unit 23 sets the second encryption key or the first conversion rule in the ECU 20A for which no second encryption key was set.

Next, the updating process performed by the conversion unit 22, the updating unit 23, and the encryption unit 24A of the ECU 20A will be described.

The conversion unit 22 determines whether or not to start the updating process. In the present embodiment, the conversion unit 22 determines to start the updating process when a key update command is received from the GW 10A via the reception unit 21A. Alternatively, the conversion unit 22 may determine to start the updating process when an elapse of a predetermined time period is recognized. Still alternatively, the conversion unit 22 may determine to start the updating process when a response to a command having been transmitted to the GW 10A via the transmission unit 21B indicates a request for updating the second encryption key.

When a key update command is received, the conversion unit 22 reads the first encryption key from the storage unit 26. The conversion unit 22 also reads the first conversion rule from the storage unit 27. Specifically, the conversion unit 22 reads the first conversion rule that was used in generating the second encryption key currently used for encrypted communication with the GW 10A.

Subsequently, the conversion unit 22 generates a second conversion rule different from the first conversion rule. For example, the conversion unit 22 generates a second conversion rule by reading the hash function algorithm from the storage unit 27 and inputting new parameters such as a CNT and an RND to the hash function algorithm.

The conversion unit 22 then converts the first encryption key by using the first conversion rule to generate a second encryption key. Alternatively, when a second encryption key is stored in the storage unit 27, the conversion unit 22 can read the second encryption key from the storage unit. 27.

Then conversion unit 22 also converts the first encryption key by using the second conversion rule to generate a third encryption key.

The encryption unit 24A encrypts the third encryption key generated by the conversion unit 22 by using the second encryption key to generate a ciphertext. The transmission unit 21B then transmits the ciphertext generated by the encryption unit 24A and the terminal ID of the ECU 20A to the GW 10A.

The updating unit 23 stores the second conversion rule used for generating the third encryption key generated by the conversion unit 22 as a first conversion rule in the storage unit 27. In this manner, the updating unit 23 updates the first conversion rule stored in the storage unit 27. Note that, as described above, the updating unit 23 may update the second encryption key stored in the storage unit 27 with the third encryption key.

As a result of these processes, the second encryption key, which is a master key to be shared with the GW 10A, is updated.

The encrypted communication unit 25 uses the second encryption key stored in the storage unit 27 for encrypted communication with the GW 10A to perform the encrypted communication and the authentication process. Thus, when the second encryption key is updated by the updating unit 23, the encrypted communication unit 25 uses the updated second encryption key to perform the encrypted communication and the authentication process. Alternatively, when the first conversion rule is stored instead of the second encryption key in the storage unit 27, the encrypted communication unit 25 can generate the second encryption key from the first encryption key by using the first conversion rule similarly to the conversion unit 22 and use the generated second encryption key for the encrypted communication and the authentication process.

Next, the GW 10A will be described.

—GW10A—

The GW 10A is an example of the server device. The GW 10A includes a transmission/reception unit 11, a comparison unit 12, a decryption unit 13A, an updating unit 14, an exception processing unit 15, an encrypted communication unit 16, and a storage unit 17, for example, as functional components relating to encrypted communication.

The storage unit 17 stores various data. The storage unit 17 is a RAM, a semiconductor memory device such as a flash memory, a hard disk, an optical disk, or the like, for example.

In the present embodiment, the storage unit 17 stores a master key management DB 17A in advance. The master key management DB 17A has terminal IDs of the ECUs 20A, with which the GW 10A is to perform encrypted communication, registered therein in advance.

FIG. 4 is a schematic diagram illustrating an example of data configuration of the master key management DB 17A. The master key management DB 17A associates a terminal ID with a second encryption key. The data format of the master key management DB 17A is not limited. In the present embodiment, the master key management DB 17A is assumed to have the terminal IDs of the ECUs 20A, with which the GW 10A is to perform encrypted communication, registered therein in advance. The master key management DB 17A also has registered therein second encryption keys respectively associated with the terminal IDs of ECUs 20A for which the second encryption keys have been set.

The description is continued referring back to FIG. 3. The storage unit 17 also stores in advance the public key of the GW 10A, a secret key of the GW 10A, and the pre-shared key. The public key of the GW 10A and the pre-shared key are as described above. The secret key of the GW 10A is a secret key associated with the public key of the GW 10A. The secret key of the GW 10A is used in a decryption process performed by the decryption unit 13A.

The transmission/reception unit 11 performs communication with the ECUs 20A. The transmission/reception unit 11 includes a reception unit 11A and a transmission unit 11B.

The transmission unit 11B transmits various data such a key setting command and a key update command to the ECUs 20A. The transmission unit 11B also transmits an error signal indicating an error, and the like to the ECUs 20A.

The reception unit 11A receives, from an ECU 20A, a terminal ID of the ECU 20A and a ciphertext.

The comparison unit 12 determines whether or not the terminal ID received from an ECU 20A is registered in the master key management DB 17A. When the terminal ID is registered in the master key management DB 17A, the GW 10A recognizes the ECU 20A having transmitted the terminal ID as an ECU 20A with which the GW 10A is to perform encrypted communication.

The decryption unit 13A reads, from the master key management DB 17A, the second encryption key associated with the terminal ID received from the ECU 20A via the reception unit 11A.

If the second encryption key associated with the received terminal ID is not set in the master key management DB 17A, the decryption unit 13A reads the secret key of the GW 10A from the storage unit 17. The decryption unit 13A then decrypts the ciphertext received from the ECU 20A by using the read secret key to obtain a third encryption key. Alternatively, the decryption unit 13A may decrypt the ciphertext received from the ECU 20A by using the pre-shared key stored in the storage unit 17 to obtain a third encryption key.

The updating unit 14 then associates the third encryption key obtained by the decryption unit 13A with the terminal ID received together with the ciphertext, and registers the third encryption key as a second encryption key in the master key management DB 17A. As a result of this process, the second encryption key that is the master key to be used for encrypted communication with the ECU 20A is set in the GW 10A.

If, on the other hand, the second encryption key associated with the received terminal ID is already set in the master key management DB 17A, the decryption unit 13A reads the second encryption key. The decryption unit 13A then decrypts the ciphertext received from the ECU 20A by using the read second encryption key to obtain a third encryption key.

In this case, the updating unit 14 associates the third encryption key obtained by the decryption unit 13A with the terminal ID received together with the ciphertext, and registers the third encryption key as a second encryption key in the master key management DB 17A. As a result of this process, the GW 10A updates the second encryption key, used for encrypted communication with the ECU 20A identified by the terminal ID, with the third encryption key.

Note that, as described above, the ECU 20A may use the first conversion rule and the second conversion rule with which the second encryption key and the third encryption key can be verified to be calculated from the same first encryption key (seed key). In this case, the decryption unit 13A of the GW 10A may verify whether or not a part of the second encryption key associated with the received terminal ID and a part of the third encryption key obtained by the decryption, which should agree to each other, are identical to each other, or whether or not the second encryption key and the third encryption key satisfy a predetermined relation. If the parts that should agree to each other are identical or if the second encryption key and the third encryption key satisfy the predetermined relation, the decryption unit 13A may then verify that the second encryption key and the third encryption key were generated from the same seed key (first encryption key). Note that the predetermined relation is that corresponding bits are complementary, that bit positions, when corresponding bits are regarded as bit strings, are replaced according to a predetermined rule, that corresponding bits, being regarded as bit strings, result from a matrix transform according to a predetermined rule, or the like, for example.

In this case, the ECU 20A may also transmit data indicating the parts that should agree to each other of the second encryption key and the third encryption key when sending the ciphertext to the GW 10A. Alternatively, data indicating the parts that should agree to each other or that have a predetermined relation with each other of the second encryption key and the third encryption key may be stored in advance in both of the ECU 20A and the GW 10A.

The decryption unit 13A of the GW 10A can then use the data indicating the parts that agree with each other or the parts satisfying the predetermined relation to verify whether or not the part of the second encryption key associated with the received terminal ID and the part of the third encryption key obtained by the decryption, which should agree to each other, are identical to each other, or whether or not the part of the second encryption key and the part of the third encryption key, which should satisfy the predetermined relation, satisfy the predetermined relation.

Note that, if the part of the second encryption key associated with the received terminal ID and the third encryption key obtained by the decryption are identical or satisfy the predetermined relation, the decryption unit 13A of the GW 10A may verify that the second encryption key and the third encryption key were generated from the same seed key (first encryption key).

The exception processing unit 15 transmits an error signal to an ECU 20A via the transmission unit 115. More specifically, if the comparison unit 12 has determined that the terminal ID received from the ECU 20A is not set in the master key management DB 17A, the exception processing unit 15 transmits an error signal to the ECU 20A.

The encrypted communication unit 16 performs the encrypted communication and the authentication process with each of the ECUs 20A identified by a terminal ID set in the master key management DB 17A by using the second encryption key associated with the terminal ID. Thus, when the second encryption key is updated by the updating unit 14, the encrypted communication unit 16 uses the updated second encryption key to perform the encrypted communication and the authentication process.

Next, example operation of the GW 10A and an ECU 20A according to the present embodiment will be described. First, an example of procedures of the initial setting process will be described.

Figure 5:
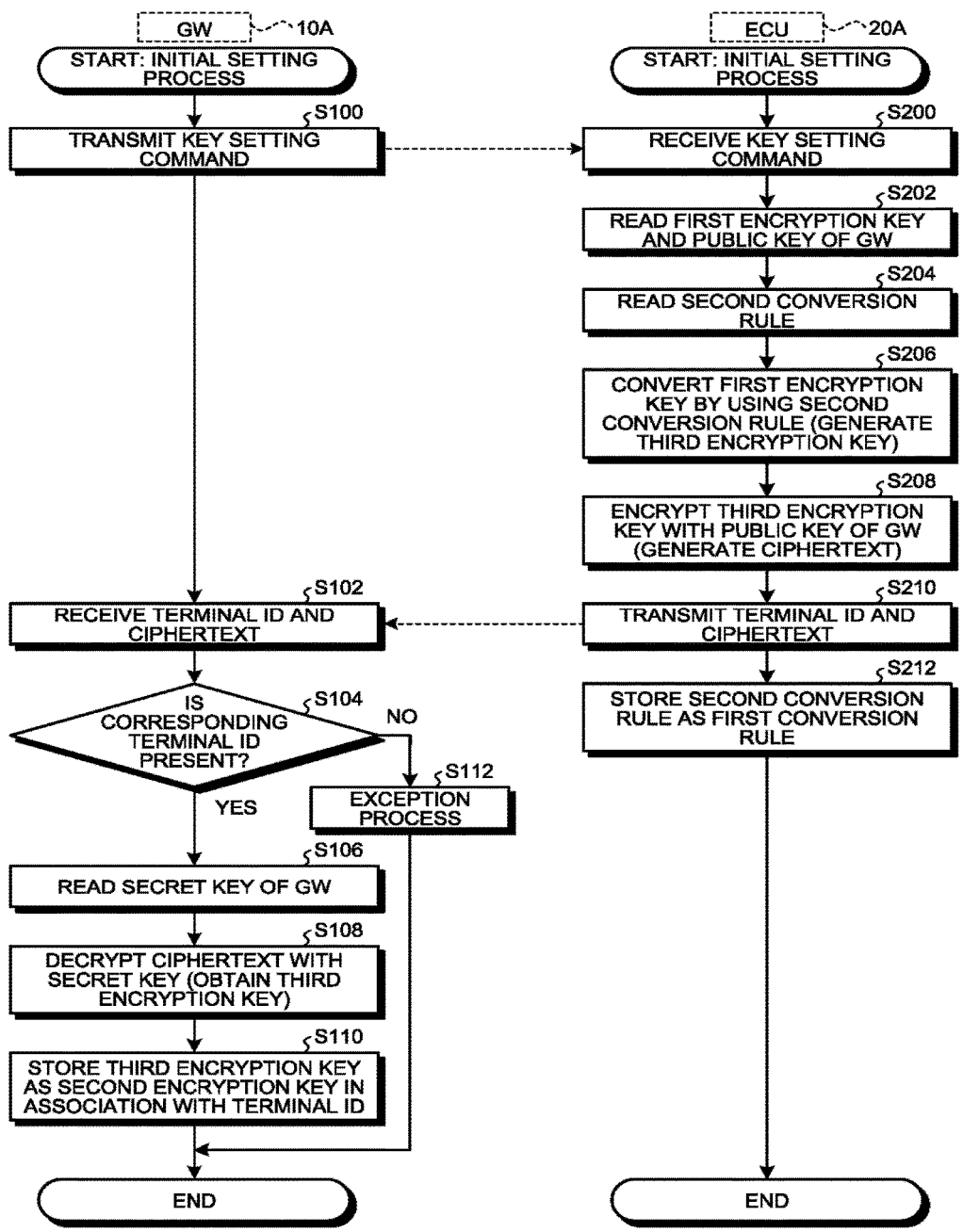
FIG. 5 is a flowchart illustrating an example of procedures of an initial setting process.

FIG. 5 is a flowchart illustrating an example of procedures of the initial setting process performed by the GW 10A and the ECU 20A. Note that, in a state before the initial setting process illustrated in FIG. 5 is performed, it is assumed that no second encryption key of an ECU 20A that communicates with the GW 10A is set in the GW 10A and the ECU 20A.

First, the transmission unit 115 of the GW 10A transmits a key setting command to the ECU 20A (step S100). The reception unit 21A of the ECU 20A receives the key setting command from the GW 10A (step S200). The conversion unit 22 of the ECU 20A reads the first encryption key from the storage unit 26, and reads the public key of the GW 10A from the storage unit 27 (step S202).

Subsequently, the conversion unit 22 of the ECU 20A reads out the second conversion rule (step S204). The conversion unit 22 generates the second conversion rule by reading a hash function algorithm from the storage unit 27 and inputting new parameters such as a CNT and an RND to the hash function algorithm. In this manner, the conversion unit 22 reads out the second conversion rule.

The conversion unit 22 of the ECU 20A then converts the first encryption key read in step S202 by using the second conversion rule read in step S204 to generate a third encryption key (step S206).

Subsequently, the encryption unit 24A of the ECU 20A encrypts the third encryption key generated in step S206 by using the public key of the GW 10A read in step S202 to generate a ciphertext (step S208).

Subsequently, the transmission unit 21E of the ECU 20A transmits the ciphertext generated in step S208 and the terminal ID of the present ECU 20A to the GW 10A (step S210).

Subsequently, the updating unit 23 of the ECU 20A stores the second conversion rule used for generating the third encryption key generated in step S206 as a first conversion rule in the storage unit 27 (step S212).

In the meantime, the reception unit 11A of the GW 10A receives the terminal ID of the ECU 20A, to which the key setting command was transmitted in step S100, and the ciphertext from the ECU 20A (step S102).

The comparison unit 12 of the GW 10A determines whether or not the terminal ID received in step S102 is registered in the master key management DE 17A (step S104). If the terminal ID is registered (step S104: Yes), the process proceeds to step S106.

In step S106, the decryption unit 13A of the GW 10A reads the secret key of the GW 10A from the storage unit 17 (step S106). The decryption unit 13A then decrypts the ciphertext received in step S102 by using the read secret key to obtain the third encryption key (step S108). Subsequently, the updating unit 14 registers the third encryption key obtained in step S108 as a second encryption key in association with the terminal ID received in step S102 in the master key management DB 17A (step S110). As a result of the processing in step S110, the second encryption key that is the master key to be used for encrypted communication with the ECU 20A is set in the GW 10A.

If, on the other hand, the determination in step S104 described above is negative (step S104: No), the process proceeds to step S112. In step S112, the exception processing unit 15 of the GW 10A performs an exception process (step S112). For example, in step S112, the exception processing unit 15 transmits an error signal to the ECU 20A from which the ciphertext in step S102 was transmitted.

Note that, in step S208 described above, the encryption unit 24A of the ECU 20A encrypts the third encryption key generated in step S206 by using the public key of the GW 10A read in step S202 to generate the ciphertext. The encryption unit 24A of the ECU 20A, however, may encrypt the third encryption key by using the pre-shared key shared with the GW 10A instead of the public key of the GW 10A to generate the ciphertext.

Next, an example of procedures of the updating process performed by the GW 10A and the ECU 20A according to the present embodiment will be described.

Figure 6:
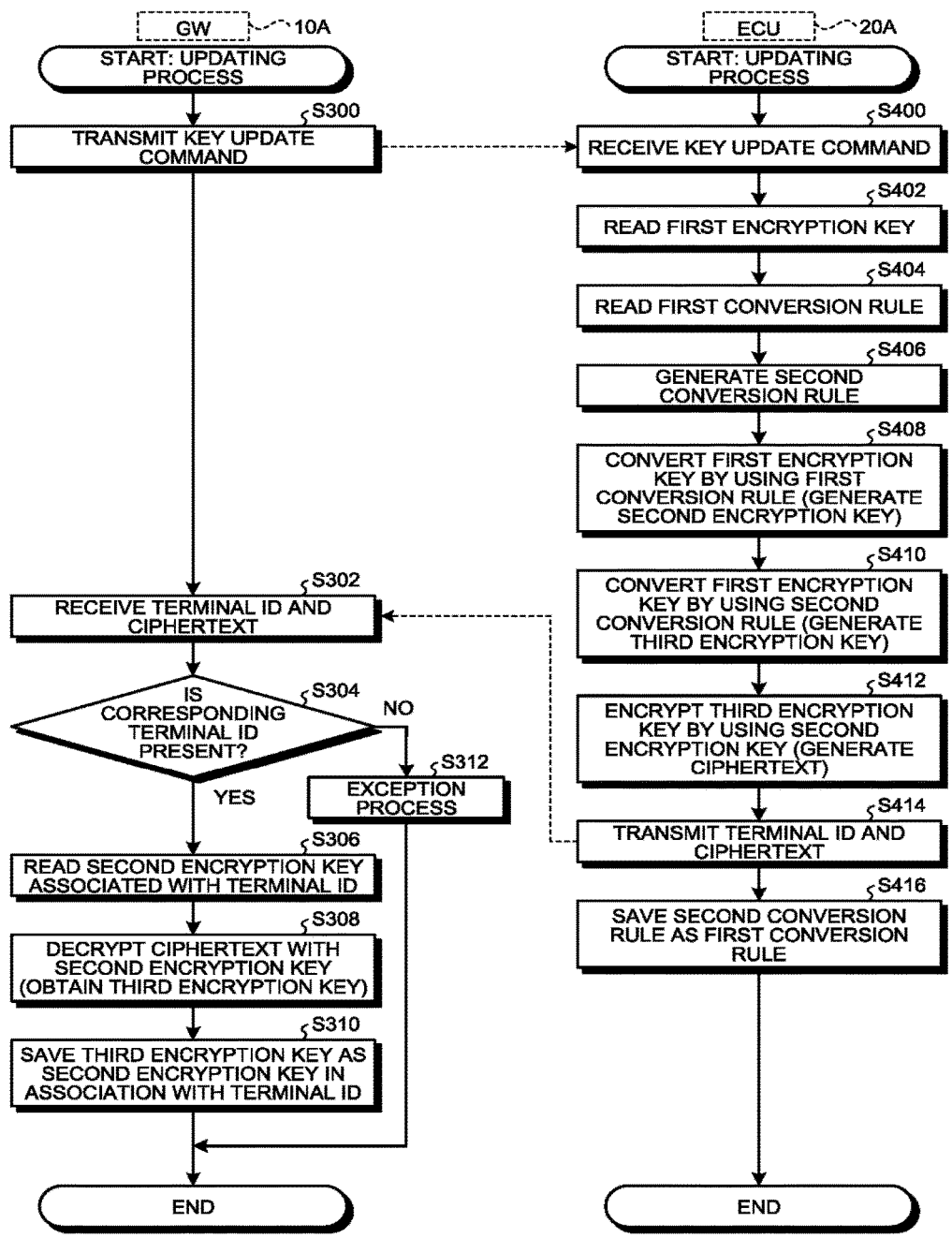
FIG. 6 is a flowchart illustrating an example of procedures of an updating process.

FIG. 6 is a flowchart illustrating the example of the procedures of the updating process performed by the GW 10A and the ECU 20A. Note that, in a state before the updating process illustrated in FIG. 6 is performed, it is assumed that the initial setting process illustrated in FIG. 5 has at least been performed.

First, the transmission unit 11B of the GW 10A transmits a key update command to the ECU 20A (step S300). The reception unit 21A of the ECU 20A receives the key update command from the GW 10A (step S400). The conversion unit 22 of the ECU 20A reads the first encryption key from the storageunit 26 (step S402).

Subsequently, the conversion unit 22 of the ECU 20A reads the first conversion rule from the storage unit 27 (step S404). Subsequently, the conversion unit 22 of the ECU 20A generates a second conversion rule (step S406). The conversion unit 22 generates the second conversion rule by reading a hash function algorithm from the storage unit 27 and inputting new parameters such as a CNT and an RND to the hash function algorithm.

The conversion unit 22 of the ECU 20A then converts the first encryption key read in step S402 by using the first conversion rule read in step S404 to generate a second encryption key (step S408).

Subsequently, the conversion unit 22 of the ECU 20A converts the first encryption key read in step S402 by using the second conversion rule generated in step S406 to generate a third encryption key (step S410).

Subsequently, the encryption unit 24A of the ECU 20A encrypts the third encryption key generated in step S410 by using the second encryption key generated in step S408 to generate a ciphertext (step S412).

Subsequently, the transmission unit 21B of the ECU 20A transmits the ciphertext generated in step S412 and the terminal ID of the present ECU 20A to the GW 10A (step S414).

Subsequently, the updating unit 23 of the ECU 20A stores the second conversion rule used for generating the third encryption key generated in step S410 as a first conversion rule in the storage unit 27 (step S416). In this manner, the second encryption key (first conversion rule in the present embodiment) for the ECU 20A is updated.

In the meantime, the reception unit 11A of the GW 10A receives the terminal ID of the ECU 20A, to which the key update command was transmitted in step S300, and the ciphertext from the ECU 20A (step S302).

The comparison unit 12 of the GW 10A determines whether or not the terminal ID received in step S302 is registered in the master key management DB 17A (step S304). If the terminal ID is registered (step S304: Yes), the process proceeds to step S306.

In step S306, the decryption unit 13A of the GW 10A reads the second encryption key associated with the terminal ID received in step S302 from the storage unit 17 (step S306). The decryption unit 13A then decrypts the ciphertext received in step S302 by using the read second encryption key to obtain the third encryption key (step S308). Subsequently, the updating unit 14 registers the third encryption key obtained in step S308 as a second encryption key in association with the terminal ID received in step S302 in the master key management DE 17A (step S310). As a result of the processing in step S310, the second encryption key that is the master key to be used for encrypted communication with the ECU 20A is updated with the third encryption key in the GW 10A.

If, on the other hand, the determination in step S304 described above is negative (step S304: No), the process proceeds to step S312. In step S312, the exception processing unit 15 of the GW 10A performs an exception process (step S312). For example, in step S312, the exception processing unit 15 transmits an error signal to the ECU 20A from which the ciphertext received in step S302 was transmitted.

As described above, the ECU 20A of the present embodiment includes the conversion unit 22, the encryption unit 24A, and the transmission unit 21B. The conversion unit 22 converts the first encryption key to be used for generating a master key to be shared with the GW 10A (server device) by using the second conversion rule, which is different from the first conversion rule for generating the second encryption key that is the master key currently used for encrypted communication with the GW 10A, to generate the third encryption key to be a new master key. The encryption unit 24A generates the ciphertext for deriving the third encryption key on the basis of the second encryption key and the third encryption key. The transmission unit 21B transmits the ciphertext to the GW 10A.

In this manner, the ECU 20A of the present embodiment uses the second encryption key, which is generated by using the first encryption key that is a seed key, as the master key shared with the GW 10A. The ECU 20A also converts the first encryption key that is the seed key by using the second conversion rule, which is different from the first conversion rule used for generating the second encryption key, to generate the third encryption key to be a new master key. Thus, the ECU 20A of the present embodiment does not update the first encryption key that is the seed key, but uses the second encryption key generated from the first encryption key as the master key and updates the second encryption key.

The ECU 20 of the present embodiment therefore prevents encryption keys (specifically, the second encryption key) from being compromised with a simple configuration without the need for a secure memory area from/into which data can be read or written for updating and setting the second encryption key that is a master key.

The ECU 20A of the present embodiment is therefore capable of preventing encryption keys from being compromised, with a simple configuration.

In addition, the ECU 20A of the present embodiment is capable of safely updating the second encryption key that is a master key shared with the GW 10A in a symmetric key encryption process suitable for processing in a compact terminal.

Second Embodiment

In the present embodiment, a mode in which difference information between a second encryption key and a third encryption key is transmitted by encrypted communication will be described.

FIG. 3 is a block diagram illustrating an example of functional configurations of a GW 10B and an ECU 20B in an information processing system 1B of the present embodiment. In the following, components that are the same as those in the first embodiment will be designated by the same reference numerals, and redundant description will not be repeated as appropriate, but only parts that are characteristic of the present embodiment will be described.

The information processing system 1B is different from the information processing system 1A in including a GW 10B and an ECU 20B instead of the GW 10A and the ECU 20A.

The ECU 20B includes a transmission/reception unit 21, a conversion unit 22, an updating unit 23, an encryption unit 24B, an encrypted communication unit 25, a storage unit 26, and a storage unit 27. The ECU 20B is similar to the ECU 20A of the first embodiment except that the ECU 20B includes the encryption unit 24B instead of the encryption unit 24A.

In the present embodiment, the encryption unit 24B encrypts difference information between a third encryption key generated by the conversion unit 22 and a second encryption key currently used for encrypted communication with the GW 10B with the second encryption key to generate a ciphertext. The transmission unit 21B then transmits the ciphertext and the terminal ID of the ECU 20B to the GW 10B.

Note that a first conversion rule and a second conversion rule used in the present embodiment are preferably such conversion rules that a second encryption key and a third encryption key generated by conversion of a first encryption key using these conversion rules are partly the same.

Specifically, in the present embodiment, hash functions satisfying the following relation are preferably used for the first conversion rule and the second conversion rule.

$$\text{Third encryption key} = KDF(FK, CNT_{i-1}, CNT_i) = \text{Hash}(FK, CNT_{i-1}) \| \text{Hash}(FK, CNT_i) \quad (1)$$

In the expression (1), KDF represents a key derivation function, and FK represents the first encryption key. In addition, in the expression (1), $CNT_{i-1}$ represents a CNT (count) value used in deriving the second encryption key, and $CNT_i$ represents a CNT value used in deriving the third encryption key.

As a result of using the hash functions satisfying the relation of the expression (1) as the first conversion rule and the second conversion rule, the difference information between the second encryption key generated from the first encryption key by using the first conversion rule and the third encryption key generated from the first encryption key by using the second conversion rule can be expressed by $\text{Hash}(FK, CNT_i)$.

In this manner, the ECU 20B of the present embodiment transmits a ciphertext generated by encrypting the difference information between the third encryption key and the second encryption key to the GW 10B, instead of the ciphertext generated by encrypting the third encryption key with the second encryption key.

The ECU 20B of the present embodiment therefore capable of reducing the amount of data of the ciphertext transmitted to the GW 10B, in addition to the effects of the first embodiment.

Specifically, when the second encryption key and the third encryption key are assumed to be of 128 bits, a ciphertext obtained by encryption of the difference information of 64 bits is to be transmitted to the GW 10B, as a result of using the above-described hash functions as the first conversion rule and the second conversion rule. Thus, in this case, the use of the difference information allows reduction of the data amount by 64 bits.

Alternatively, in view of reducing the data amount of a ciphertext to be transmitted, stream ciphers may be used for the first conversion rule and the second conversion rule.

Alternatively, in the present embodiment, has functions satisfying the following relation may be used for the first conversion rule and the second conversion rule.

$$\text{Third encryption key} = KDF(FK, CNT_{i-1}, CNT_i) = T(\text{Hash}(FK, CNT_{i-1}) \| \text{Hash}(FK, CNT_i)) \quad (2)$$

In the expression (2), KDF, FK, $CNT_{i-1}$, and $CNT_i$ are the same as those in the expression (1). In the expression (2), T represents affine transformation accompanied by a hash function and a matrix operation.

Alternatively, the first conversion rule and the second conversion rule used in the present embodiment may be conversion rules other than those with hash functions. For example, the first conversion rule and the second conversion rule may be conversion rules expressed by matrix operations.

Note that, in the present embodiment, a case in which the encryption unit 24B encrypts difference information between one third encryption key generated by the conversion unit 22 and one second encryption key currently used for encrypted communication with the GW 10B will be described. The encryption unit 24B, however, may encrypt difference information between a third encryption key generated by the conversion unit 22 and a plurality of second encryption keys currently and previously used for encrypted communication with the GW 10B. As a result of using the difference information between the third encryption key and the second encryption keys, the amount of data to be transmitted can further be reduced.

Next, the GW 10B will be described. The GW 10B includes a transmission/reception unit 11, a comparison unit 12, a decryption unit 13B, an updating unit 14, an exception processing unit 15, an encrypted communication unit 16, and a storage unit 17. The GW 10B is similar to the GW 10A of the first embodiment except that the GW 10B includes the decryption unit 13B instead of the decryption unit 13A.

The decryption unit 13B reads, from the master key management DB 17A, the second encryption key associated with the terminal ID received from the ECU 20B via the reception unit 11A.

If the second encryption key associated with the received terminal ID is not registered in the master key management DB 17A, the decryption unit 13B can perform the same process as the decryption unit 13A of the first embodiment.

If, on the other hand, the second encryption key associated with the terminal ID is already registered in the master key management DB 17A, the decryption unit 13B reads the second encryption key. The decryption unit 13B then decrypts the ciphertext received from the ECU 20B by using the read second encryption key to obtain the difference information.

The decryption unit 13B then calculates the third encryption key from the read second encryption key and the difference information.

Similarly to the first embodiment, the updating unit 14 then associates the obtained third encryption key with the terminal ID received together with the ciphertext, and registers the third encryption key as a second encryption key in the master key management DB 17A. As a result of this process, the GW 10B updates the second encryption key, used for encrypted communication with the ECU 20B identified by the terminal ID, with the third encryption key.

Next, example operation of the GW 10B and the ECU 20B according to the present embodiment will be described. Note that, since the procedures of the initial setting process are similar to those in the first embodiment, the description thereof will not be repeated.

Figure 7:
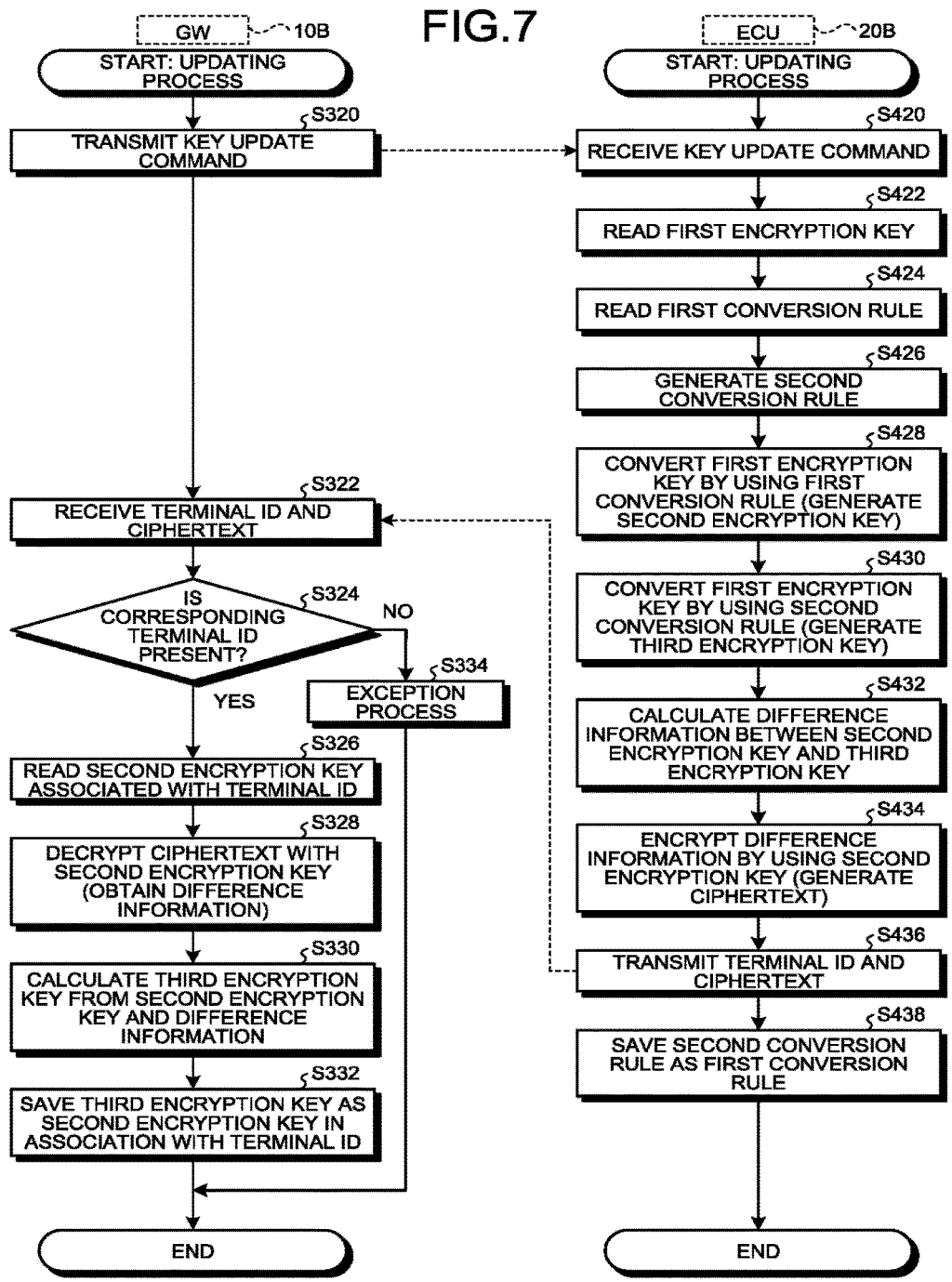
FIG. 7 is a flowchart illustrating an example of procedures of an updating process.

FIG. 7 is a flowchart illustrating an example of the procedures of the updating process performed by the GW 10B and the ECU 20B. Note that, in a state before the updating process illustrated in FIG. 7 is performed, it is assumed that the initial setting process has at least been performed.

First, the transmission unit 11B of the GW 10B transmits a key update command to the ECU 20B (step S320). The reception unit 21A of the ECU 20B receives the key update command from the GW 10B (step S420). The conversion unit 22 of the ECU 20B reads the first encryption key from the storage unit 26 (step S422).

Subsequently, the conversion unit 22 of the ECU 20B reads the first conversion rule from the storage unit 27 (step S424). Subsequently, the conversion unit 22 of the ECU 20B generates a second conversion rule (step S426). The conversion unit 22 of the ECU 20B then converts the first encryption key read in step S422 by using the first conversion rule read in step S424 to generate a second encryption key (step S428).

Subsequently, the conversion unit 22 of the ECU 20B converts the first encryption key read in step S422 by using the second conversion rule generated in step S426 to generate a third encryption key (step S430).

Subsequently, the encryption unit 24B of the ECU 20B calculates the difference information between the third encryption key generated in step S430 and the second encryption key generated in step S428 (step S432). The encryption unit 24B then encrypts the difference information calculated in step S432 by using the second encryption key generated in step S428 to generate a ciphertext (step S434).

Subsequently, the transmission unit 21B of the ECU 20B transmits the ciphertext generated in step S434 and the terminal ID of the present ECU 20B to the GW 10B (step S436).

Subsequently, the updating unit 23 of the ECU 20B stores the second conversion rule used for generating the third encryption key generated in step S430 as a first conversion rule in the storage unit 27 (step S438). In this manner, the second encryption key (first conversion rule in the present embodiment) for the ECU 20B is updated.

In the meantime, the reception unit 11A of the GW 10B receives the terminal ID of the ECU 20B, to which the key update command was transmitted in step S320, and the ciphertext from the ECU 20B (step S322).

The comparison unit 12 of the GW 10B determines whether or not the terminal ID received in step S322 is registered in the master key management DB 17A (step S324). If the terminal ID is registered (step S324: Yes), the process proceeds to step S326.

In step S326, the decryption unit 13B of the GW 10B reads the second encryption key associated with the terminal ID received in step S322 from the storage unit (step S326). The decryption unit 13B then decrypts the ciphertext received in step S322 by using the read second encryption key to obtain the difference information (step S328). Subsequently, the decryption unit 13B calculates the third encryption key from the difference information obtained in step S328 and the second encryption key read in step S326 (step S330).

Subsequently, the updating unit 14 registersthe third encryption key obtained in step S330 as a second encryption key in association with the terminal ID received in step S322 in the master key management DB 17A (step S332). As a result of the processing in step S332, the second encryption key that is the master key to be used for encrypted communication with the ECU 20B is updated with the third encryption key in the GW 10B.

If, on the other hand, the determination in step S324 described above is negative (step S324: No), the process proceeds to step S334. In step S334, the exception processing unit 15 of the GW 10B performs an exception process (step S334). For example, in step S334, the exception processing unit 15 transmits an error signal to the ECU 20B from which the ciphertext received in step S332 was transmitted.

As described above, in the ECU 20B of the present embodiment, the encryption unit 24B encrypts the difference information between the third encryption key and the second encryption key with the second encryption key to generate a ciphertext. The transmission unit 21B then transmits the ciphertext to the GW 10B.

The ECU 20B of the present embodiment is therefore capable of reducing the communication data amount, in addition to the effects of the first embodiment.

Third Embodiment

In the present embodiment, verification data for verifying the correctness of a third encryption key are further used.

FIG. 3 is a block diagram illustrating an example of functional configurations of a GW 10C and an ECU 20C in an information processing system 1C of the present embodiment. In the following, components that are the same as those in the first embodiment will be designated by the same reference numerals, and redundant description will not be repeated as appropriate, but only parts that are characteristic of the present embodiment will be described.

The information processing system 1C is different from the information processing system 1A in including a GW 10C and an ECU 20C instead of the GW 10A and the ECU 20A.

The ECU 20C includes a transmission/reception unit , a conversion unit 22, an updating unit 23, an encryption unit 24C, an encrypted communication unit 25, a storage unit 26, and a storage unit 27. The ECU 20C is the same as the ECU 20A of the first embodiment except that the ECU 20C includes the encryption unit 24C instead of the encryption unit 24A.

In the present embodiment, the encryption unit 24C calculates difference information between a third encryption key generated by the conversion unit 22 and a second encryption key currently used for encrypted communication with the GW 10C. The encryption unit 24C further generates verification data for verifying the correctness of the third encryption key.

Examples of the verification data include a predetermined eigen value, inverted data of the difference information, a parity bit calculated from the difference information, and an authenticator calculated from the difference information and the third encryption key.

The encryption unit 24C then encrypts the verification data and the difference with the second encryption key to generate a ciphertext. The transmission unit 21B then transmits the ciphertext and the terminal ID of the ECU 20C to the GW 10C.

Note that conversion rules similar to those in the second embodiment are preferably used for the first conversion rule and the second conversion rule used in the present embodiment.

Note that, in the second embodiment, when the encryption unit 24B performs encryption by using block cipher, communication data need to be converted to data having a predetermined length by adding fixed data such as "0" before encrypted communication.

In contrast, in the present embodiment, when the encryption unit 24C performs encryption by using block cipher, the encryption unit 24C only need to embed verification data to the position where fixed data such as "0" should be added before encrypted communication.

Next, the GW 10C will be described. The GW 10C includes a transmission/reception unit 11, a comparison unit 12, a decryption unit 13C, an updating unit 14, an exception processing unit 15, an encrypted communication unit 16, and a storage unit 17. The GW 10C is the same as the GW 10A of the first embodiment except that the GW 10C includes the decryption unit 13C instead of the decryption unit 13A.

The decryption unit 13C reads, from the master key management DB 17A, the second encryption key associated with the terminal ID received from the ECU 20C via the reception unit 11A.

If the second encryption key associated with the received terminal ID is not registered in the master key management DB 17A, the decryption unit 13C can perform the same process as the decryption unit 13A of the first embodiment.

If, on the other hand, the second encryption key associated with the terminal ID is already registered in the master key management DB 17A, the decryption unit 13C reads the second encryption key. The decryption unit 13C then decrypts the ciphertext received from the ECU 20C by using the read second encryption key to obtain the difference information and the verification data.

The decryption unit 13C then calculates the third encryption key from the read second encryption key and the difference information. The decryption unit 13C further verifies whether or not the calculated third encryption key is correct by verifying the verification data.

If the third encryption key is verified to be correct, the updating unit 14 then associates the obtained third encryption key with the terminal ID received together with the ciphertext, and registers the third encryption key as a second encryption key in the master key management DB 17A, similarly to the first embodiment. As a result of this process, the GW 10C updates the second encryption key, used for encrypted communication with the ECU 20C identified by the terminal ID, with the third encryption key.

Next, example operation of the GW 10C and the ECU 20C according to the present embodiment will be described. Note that, since the procedures of the initial setting process are similar to those in the first embodiment, the description thereof will not be repeated.

Figure 8:
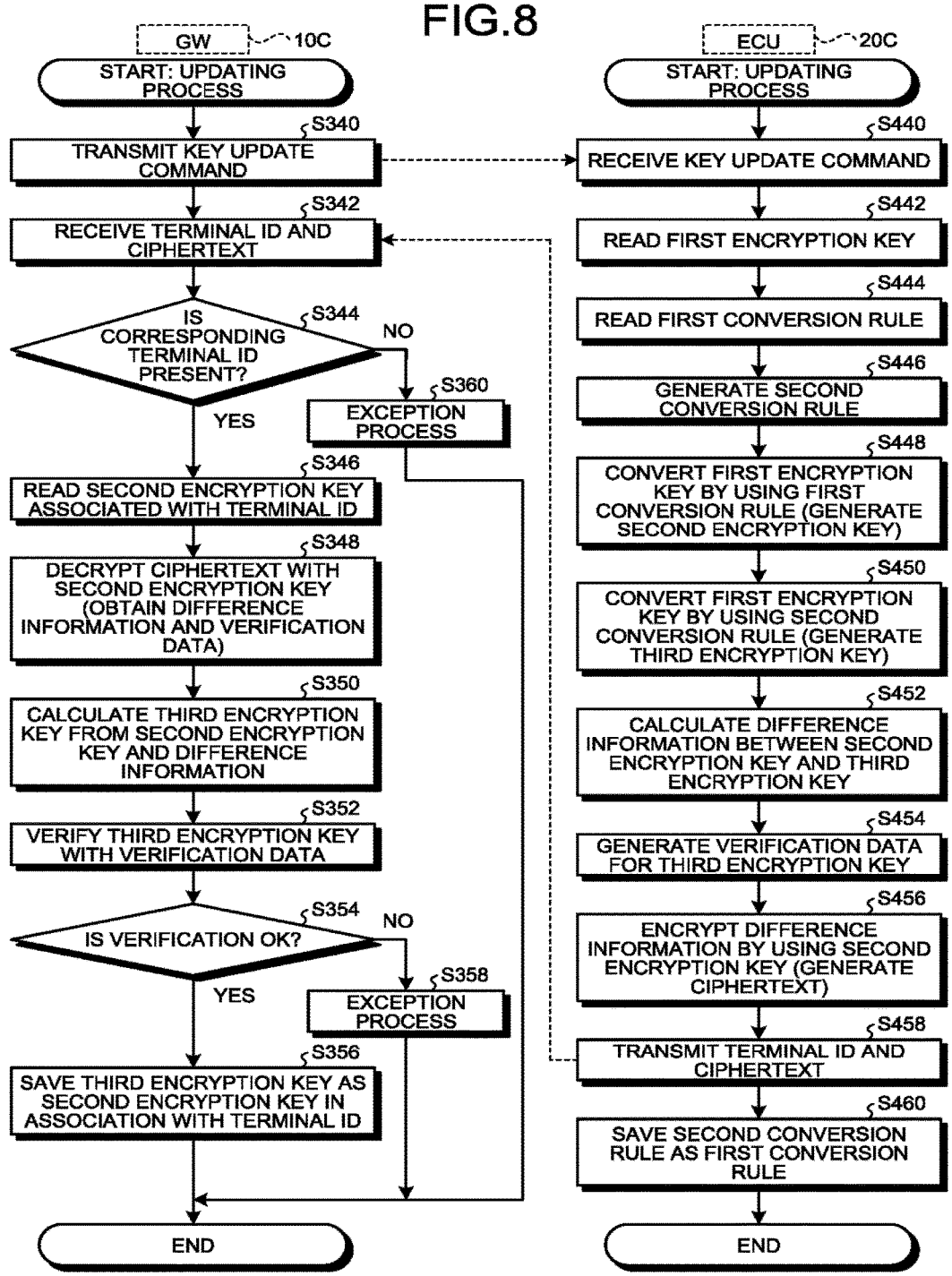
FIG. 8 is a flowchart illustrating an example of procedures of an updating process.

FIG. 8 is a flowchart illustrating an example of the procedures of the updating process performed by the GW 10C and the ECU 20C. Note that, in a state before the updating process illustrated in FIG. 8 is performed, it is assumed that the initial setting process has at least been performed First, the transmission unit 11B of the GW 10C transmits a key update command to the ECU 20C (step S340). The reception unit 21A of the ECU 20C receives the key update command from the GW 10C (step S440). The conversion unit 22 of the ECU 20C reads the first encryption key from the storage unit 26 (step S442).

Subsequently, the conversion unit 22 of the ECU 20C reads the first conversion rule from the storage unit 27 (step S444). Subsequently, the conversion unit 22 of the ECU 20C generates a second conversion rule (step S446). The conversion unit 22 of the ECU 20C then converts the first encryption key read in step S442 by using the first conversion rule read in step S444 to generate a second encryption key (step S448).

Subsequently, the conversion unit 22 of the ECU 20C converts the first encryption key read in step S442 by using the second conversion rule generated in step S446 to generate a third encryption key (step S450).

Subsequently, the encryption unit 24C of the ECU 20C calculates the difference information between the third encryption key generated in step S450 and the second encryption key generated in step S448 (step S452). The encryption unit 24C further generates verification data by using the third encryption key generated in step S450 and the difference information calculated in step S452 (step S454).

Subsequently, the encryption unit 24C of the ECU 20C encrypts the difference information and the verification data obtained in step S452 and step S454 by using the second encryption key generated in step S448 to generate a ciphertext (step S456).

Subsequently, the transmission unit 21B of the ECU 20C transmits the ciphertext generated in step S456 and the terminal ID of the present ECU 20C to the GW 10C (step S458).

Subsequently, the updating unit 23 of the ECU 20C stores the second conversion rule used for generating the third encryption key generated in step S450 as a first conversion rule in the storage unit 27 (step S460). In this manner, the second encryption key (first conversion rule in the present embodiment) for the ECU 20C is updated.

In the meantime, the reception unit 11A of the GW 10C receives the terminal ID of the ECU 20C, to which the key update command was transmitted in step S340, and the ciphertext from the ECU 20C (step S342).

The comparison unit 12 of the GW 10C determines whether or not the terminal ID received in step S342 is registered in the master key management DB 17A (step S344). If the terminal ID is registered (step S344: Yes), the process proceeds to step S346.

In step S346, the decryption unit 13C of the GW 10C reads the second encryption key associated with the terminal ID received in step S342 from the storage unit 17 (step S346). The decryption unit 13C then decrypts the ciphertext received in step S342 by using the read second encryption key to obtain the difference information and the verification data (step S348). Subsequently, the decryption unit 13C calculates the third encryption key from the difference information obtained in step S348 and the second encryption key read in step S346 (step S350).

Subsequently, the decryption unit 13C of the GW 10C verifies the third encryption key obtained in step S350 by using the verification data obtained in step S348 (step S352). If the third encryption key is verified to be correct (step S354: Yes), the process proceeds to step S356. In step S356, the updating unit 14 of the GW 10C registers the third encryption key obtained in step S350 as a second encryption key in association with the terminal ID received in step S342 in the master key management DB 17A (step S356). As a result of the processing in step S356, the second encryption key that is the master key to be used for encrypted communication with the ECU 20C is updated with the third encryption key in the GW 10C.

If, on the other hand, the determination in step S354 described above is negative (step S354: No), the process proceeds to step S358. In step S358, the exception processing unit 15 of the GW 10C performs an exception process (step S358). For example, in step S358, the exception processing unit 15 transmits an error signal to the ECU 20C from which the ciphertext received in step S342 was transmitted.

Similarly, if the determination in step S344 described above is negative (step S344: No), the process proceeds to step S360. In step S360, the exception processing unit 15 of the GW 10C performs an exception process (step S360). For example, in step S360, the exception processing unit 15 transmits an error signal to the ECU 20C from which the ciphertext received in step S342 was transmitted.

As described above, in the ECU 20C of the present embodiment, the encryption unit 24C encrypts the difference information between the third encryption key and the second encryption key and the verification data for verifying the correctness of the third encryption key with the second encryption key to generate a ciphertext. The transmission unit 21B then transmits the ciphertext to the GW 10C.

The ECU 20C of the present embodiment is therefore capable of reducing the communication data amount and guaranteeing the validity of the third encryption key with which the second encryption key is updated, in addition to the effects of the first embodiment.

Fourth Embodiment

In the present embodiment, an ECU 20D has a physically unclonable function (PUF) unit configured to output unique data specific to each device, and generates a first encryption key that is a seed key by using the unique data output from the PUF unit.

Figure 9:
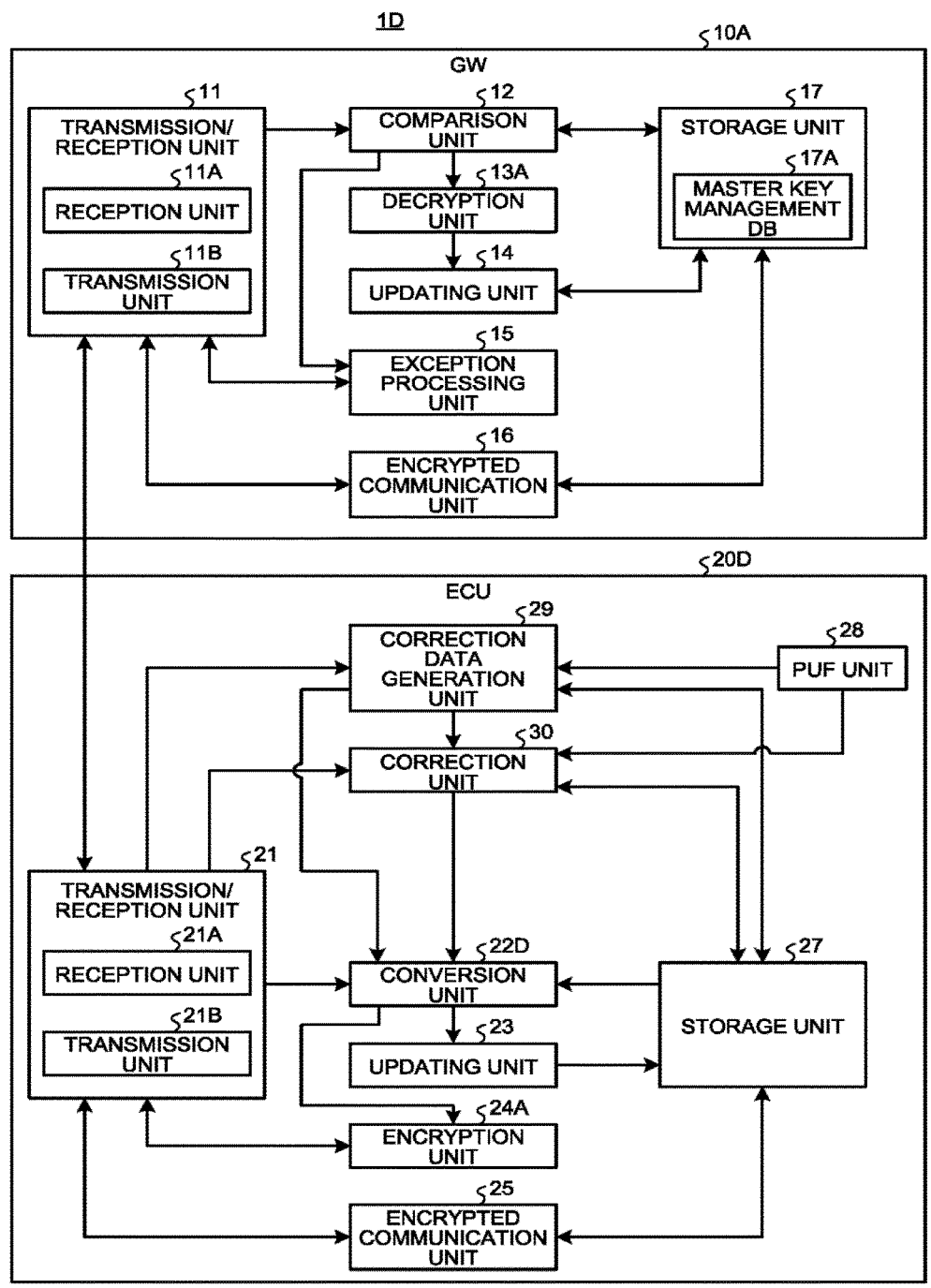
FIG. 9 is a block diagram illustrating an example of functional configurations of a GW and an ECU.

FIG. 9 is a block diagram illustrating an example of functional configurations of a GW 10A and the ECU 20D in an information processing system 1D of the present embodiment. In the following, components that are the same as those in the first embodiment will be designated by the same reference numerals, and redundant description will not be repeated as appropriate, but only parts that are characteristic of the present embodiment will be described.

The information processing system 1D is different from the information processing system 1A in including the ECU 20D instead of the ECU 20A.

The ECU 20D includes a transmission/reception unit 21, a conversion unit 22D, an updating unit 23, an encryption unit 24A, an encrypted communication unit 25, a storage unit 27, a PUF unit 28, a correction data generation unit 29, and a correction unit 30.

The ECU 20D is different from the ECU 20A in not including the storage unit 26. In addition, the ECU 20D includes the conversion unit 22D instead of the conversion unit 22. In addition, the ECU 20D further includes the PUF unit 28, the correction data generation unit 29, and the correction unit 30. The ECU 20D similar to the ECU 20A of the first embodiment in the other respects.

The PUF unit 28 outputs unique data specific to the ECU 20D. More specifically, the PUF unit 28 is a physically unclonable function. A physically unclonable function is a function which is installed in a device and outputs a value (unique data) specific to the device from one input. Thus, the PUF unit 28 outputs unique data specific to the ECU 20D.

The correction data generation unit 29 generates correction data for the unique data output from the PUF unit 28. The correction data are data for generating a stable first encryption key by using the unique data output from the PUF unit 28. In other words, the correction data guarantees that first encryption keys generated on the basis of unique data newly output from the PUF unit 28 are the same first encryption key.

For the correction data, helper data of fuzzy extractors capable of stably extracting information from data containing noise, for example.

The correction unit 30 generates a first encryption key by using the unique data output from the PUF unit 28 and the correction data generated by the correction data generation unit 29. For example, the correction unit 30 combines the unique data output from the PUF unit 28 with the correction data (helper data, for example) to generate the first encryption key according to a predetermined algorithm.

Note that the correction data generation unit 29 generates the correction data at the time of the initial setting process. At the time of the updating process, the correction unit 30 then generates the first encryption key by using the correction data and the unique data newly output from the PUF unit 28.

The conversion unit 22D generates a third encryption key similarly to the conversion unit 22 of the first embodiment except that the first encryption key generated by the correction unit 30 is used.

In this manner, in the present embodiment, the ECU 20D generates the first encryption key by using the unique data output from the PUF unit 28 without storing the first encryption key in advance. Thus, the storage unit 26 for storing in advance the first encryption key to be used as a seed key need not be provided, and encryption keys are further prevented from being compromised.

Next, example operation of the GW 10A and the ECU 20D according to the present embodiment will be described. First, an example of procedures of the initial setting process will be described.

Figure 10:
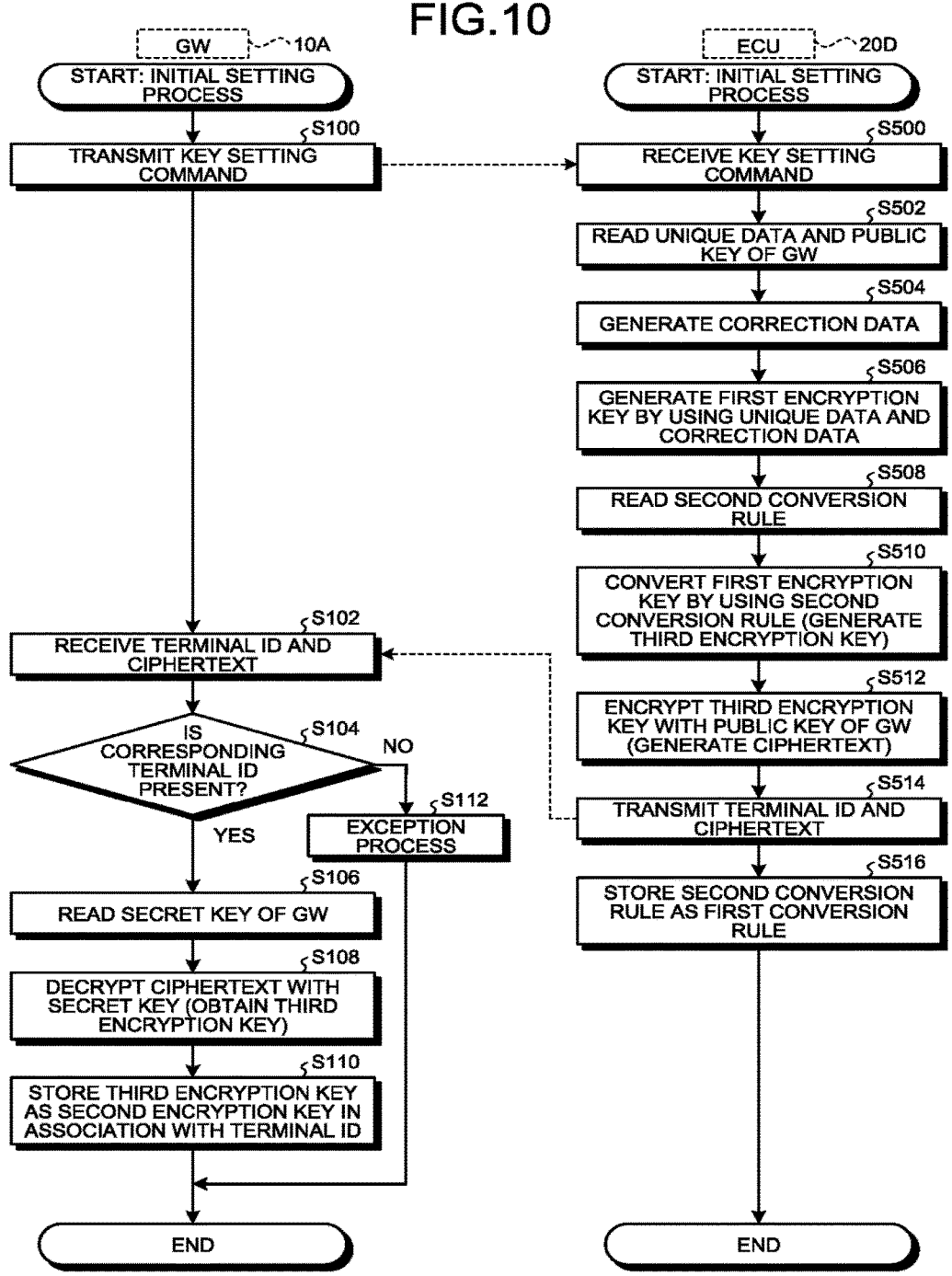
FIG. 10 is a flowchart illustrating an example of procedures of an initial setting process.

FIG. 10 is a flowchart illustrating an example of procedures of the initial setting process performed by the GW 10A and the ECU 20D. Note that, in a state before the initial setting process illustrated in FIG. 10 is performed, it is assumed that no second encryption key of the ECU 20D that communicates with the GW 10A is set in the GW 10A and the ECU 20D. Note that the processing of the GW 10A is similar to that in the first embodiment.

First, the transmission unit 11B of the GW 10A transmits a key setting command to the ECU 20D (step S100).

The reception unit 21A of the ECU 20D receives the key setting command from the GW 10A (step S500). The correction data generation unit 29 of the ECU 20D reads unique data from the PUF unit 28, and reads the public key of the GW 10A from the storage unit 27 (step S502).

Subsequently, the correction data generation unit 29 of the ECU 20D generates correction data for the unique data read in step S502 (step S504). The correction data generation unit 29 then stores the generated correction data in the storage unit 27.

Subsequently, the correction unit 30 of the ECU 20D generates a first encryption key by using the unique data read in step S502 and the correction data generated in step S504 (step S506).

Subsequently, the conversion unit 22D of the ECU 20D reads out a second conversion rule similarly to the conversion unit 22 of the first embodiment (step S508). The conversion unit 22D of the ECU 20D then converts the first encryption key generated in step S506 by using the second conversion rule read in step S508 to generate a third encryption key (step S510).

Subsequently, the encryption unit 24A of the ECU 20D encrypts the third encryption key generated in step S510 by using the public key of the GW 10A read in step S502 to generate a ciphertext (step S512).

Subsequently, the transmission unit 21B of the ECU 20D transmits the ciphertext generated in step S512 and the terminal ID of the present ECU 20D to the GW 10A (step S514).

Subsequently, the updating unit 23 of the ECU 20D stores the second conversion rule used for generating the third encryption key generated in step S510 as a first conversion rule in the storage unit 27 (step S516).

In the meantime, the GW 10A performs processing similar to that in steps S102 to S112 in the first embodiment (also see FIG. 5).

Next, an example of procedures of the updating process performed by the GW 10A and the ECU 20D of the present embodiment will be described.

Figure 11:
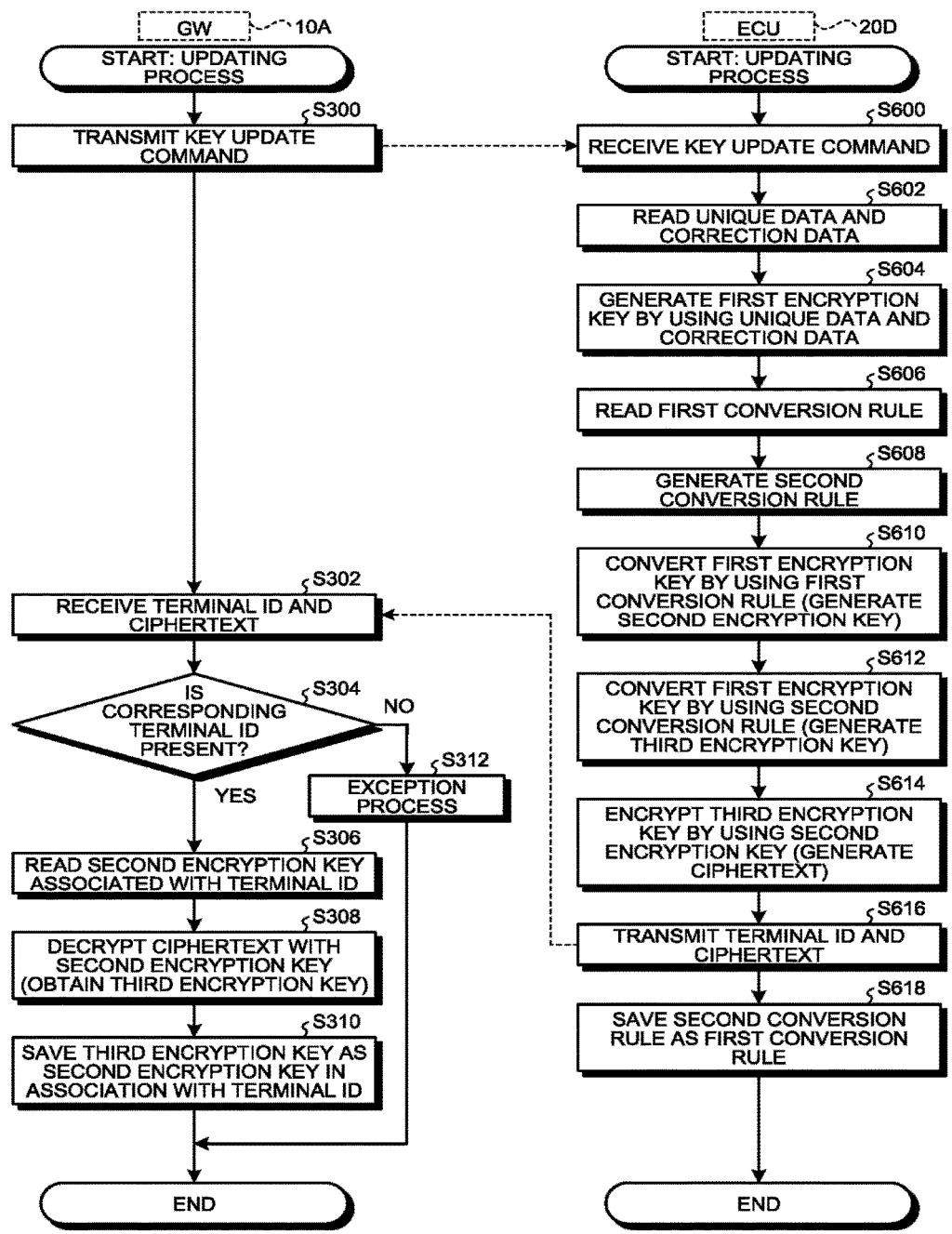
FIG. 11 is a flowchart illustrating an example of procedures of an updating process.

FIG. 11 is a flowchart illustrating the example of the procedures of the updating process performed by the GW 10A and the ECU 20D. Note that, in a state before the updating process illustrated in FIG. 11 is performed, it is assumed that the initial setting process illustrated in FIG. 10 has at least been performed.

First, the transmission unit 11B of the GW 10A transmits a key update command to the ECU 20D (step S300). The reception unit 21A of the ECU 20D receives the key update command from the GW 10A (step S600).

The correction unit 30 of the ECU 20D reads the unique data output from the PUF unit 28 and the correction data stored in the storage unit 27 (step S602).

Subsequently, the correction unit 30 generates a first encryption key by using the unique data and the correction data read in step S602 (step S604).

Subsequently, the conversion unit 22D of the ECU 20D reads the first conversion rule from the storage unit 27 (step S606). Subsequently, the conversion unit 22D of the ECU 20D generates a second conversion rule (step S608). The processing in step S608 is similar to that in step S406 of the first embodiment (see FIG. 6).

Subsequently, the conversion unit 22D of the ECU 20D converts the first encryption key generated in step S604 by using the first conversion rule read in step S606 to generate a second encryption key (step S610).

Subsequently, the conversion unit 22D of the ECU 20D converts the first encryption key generated in step S604 by using the second conversion rule generated in step S608 to generate a third encryption key (step S612).

Subsequently, the encryption unit 24A of the ECU 20D encrypts the third encryption key generated in step S612 by using the second encryption key generated in step S610 to generate a ciphertext (step S614). Subsequently, the transmission unit 21B of the ECU 20D transmits the ciphertext generated in step S614 and the terminal ID of the present ECU 20D to the GW 10A (step S616). Subsequently, the updating unit 23 of the ECU 20D stores the second conversion rule used for generating the third encryption key generated in step S612 as a first conversion rule in the storage unit 27 (step S618). In this manner, the second encryption key (first conversion rule in the present embodiment) for the ECU 20D is updated.

In the meantime, upon receiving the terminal ID and the ciphertext from the ECU 20D, the GW 10A performs processing similar to that in steps S302 to S312 of the first embodiment (steps S302 to step S312).

As described above, the ECU 20D of the present embodiment generates a first encryption key by using the unique data output from the PUF unit 28. Thus, the ECU 20D of the present embodiment need not be provided with the storage unit 26 for storing in advance the first encryption key to be used as a seed key. The ECU 20D of the present embodiment is therefore capable of further preventing encryption keys from being compromised.

The ECU 20D of the present embodiment is therefore capable of further preventing encryption keys from being compromised, in addition to the effects of the first embodiment.

Furthermore, the ECU 20D of the present embodiment is capable of reducing the risk of leakage of the first encryption key due to illicit attack on the ECU 20D or the like.

In the present embodiment, a case in which the correction data generation unit 29 of the ECU 20D generates the correction data for the unique data read from the PUF unit 28 and stores the correction data in the storage unit 27 has been described. The timing for generating the correction data may, however, be before the ECU 20D is incorporated in the system, such as during manufacture of the ECU 20D. In this case, the ECU 20D may not have the correction data generation unit 29. In addition, in this case, the correction data can be stored in advance in the storage unit 27.

MODIFIED EXAMPLE

In the fourth embodiment described above, a mode in which the ECU 20D generates the first encryption key from the correction data for the unique data output from the PUF unit 28 and the unique data newly output from the PUF unit 28 at the time of the updating process has been described.

The ECU 20D, however, may generate the first encryption key by the following method using the unique data output from the PUF unit 28.

Specifically, in the initial setting process, the correction data generation unit 29 generates correction data (hereinafter referred to as primary correction data) for unique data output from the PUF unit 28 output similarly to the fourth embodiment.

The correction data generation unit 29 further generates an encryption key (hereinafter referred to as a primary encryption key) by using the unique data and the primary correction data. For example, the correction data Generation unit 29 combines the unique data and the primary correction data (helper data) to generate the primary encryption key according to a predetermined algorithm or the like.

The correction data generation unit 29 then reads a first encryption key stored in advance. In this case, the ECU 20D can store the first encryption key in the storage unit 27 or the like at the time of initial shipment of the ECU 20D or the like. The correction data generation unit 29 encrypts the read first encryption key by using the primary encryption key to generate a ciphertext (hereinafter referred to as a primary ciphertext).

The correction data generation unit 29 then stores the primary correction data and the primary ciphertext in the storage unit 27. Specifically, the correction data generation unit 29 generates primary correction data and primary ciphertext and stores the correction data and the primary ciphertext in the storage unit 27 at the time of the initial setting process.

At the time of the updating process, the correction unit 30 then generates the primary encryption key by using unique data newly output from the PUF unit 28 and the primary correction data stored in the storage unit 27. For example, the correction unit 30 combines the unique data newly output from the PUF unit 28 and the primary correction data (helper data) to generate the primary encryption key according to a predetermined algorithm or the like.

The correction unit 30 further decrypts the primary ciphertext stored in the storage unit 27 by using the generated primary encryption key to generate a first encryption key to be used as a seed key.

In this manner, the ECU 20D may obtain the first encryption key by decrypting the first encryption key on the basis of the unique data output from the PUF unit 28.

In the present modified example, similarly to the fourth embodiment described above, the timing for generating the correction data may be before the ECU 20D is incorporated in the system, such as during manufacture of the ECU 20D. In this case, the ECU 20D may not have the correction data generation unit 29.

Supplementary Explanation

Note that the above-described functions of the GWs 10A, 10B, and 10C, and the ECUs 20A, 20B, 20C, and 20D can be implemented by cooperation of the hardware illustrated in FIG. 2 and software, for example. In this case, the above-described functional components are implemented by the microcontroller 9 performing control according to programs provided as software while using the network I/F 8.

The programs for implementing the functional components of the GWs 10A, 10B, and 10C, and the ECUs 20A, 20B, 20C, and 20D are embedded in a memory area or the like in the microcontroller 9 in advance and provided therefrom, for example. Alternatively, the programs may be recorded on a computer-readable recording medium such as a CD-ROM, a flexible disk (FD), a CD-R, or a DVD in a form of a file that can be installed or executed and provided therefrom. Alternatively, the programs may be stored on a computer system connected to a network such as the Internet, and provided by being downloaded via the network. Still alternatively, the programs may be provided or distributed through a network such as the Internet. Note that some or all of the above-described functional components of the GWs 10A, 10B, and 10C, and the ECUs 20A, 20B, 20C, and 20D can be implemented by dedicated hardware such as ASICs and FPGAs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
an information processing device having:
one or more processors configured to:
convert a first encryption key to be used for generation of a master key to be shared with a server device by using a second conversion rule to generate a third encryption key to be a new master key, the second conversion rule being different from a first conversion rule used for generation of a second encryption key that is the master key currently used for encrypted communication with the server device,
generate a ciphertext so that the server device derives the third encryption key on a basis of the second encryption key and the third encryption key, and
transmit the ciphertext to the server device, wherein the server device has:
one or more processors configured to:
receive, from the information processing device, the ciphertext for deriving the third encryption key being the new master key to be shared with the information processing device, the ciphertext being generated on a basis of the third encryption key and the second encryption key, the third encryption key being generated by converting the first encryption key used for generating the master key to be shared with the information processing device by using the second conversion rule different from the first conversion rule used for generation of the second encryption key, the second encryption key being the master key currently used for encrypted communication with the information processing device,
decrypt the ciphertext by using the second encryption key to obtain the third encryption key, and
update the third encryption key as the second encryption key to be shared with the information processing device.

2. A moving object comprising: the information processing system according to claim 1.

* * * * *